United States Patent [19]

Duffy

[11] Patent Number: 4,571,450
[45] Date of Patent: Feb. 18, 1986

[54] MOISTURE IMPERVIOUS POWER CABLE AND CONDUIT SYSTEM

[75] Inventor: Edward K. Duffy, West Lafayette, Ind.

[73] Assignee: Essex Group, Inc., Fort Wayne, Ind.

[21] Appl. No.: 565,941

[22] Filed: Dec. 27, 1983

[51] Int. Cl.⁴ .................. H02G 9/06; H02G 3/04; H01B 9/02
[52] U.S. Cl. ............... 174/68 C; 174/106 SC; 174/106 D; 174/107
[58] Field of Search ............ 174/68 R, 68 C, 102 SC, 174/102 D, 106 R, 106 SC, 106 D, 107, 102 R, 105 SC, 120 SC

[56] References Cited

U.S. PATENT DOCUMENTS

| | | |
|---|---|---|
| 2,111,229 | 3/1938 | Thompson .................. 174/106 SC |
| 3,132,415 | 5/1964 | Johnson et al. .............. 174/68 C X |
| 3,202,754 | 8/1965 | Ruch ........................... 174/68 R |
| 3,651,244 | 3/1972 | Silver et al. ................ 174/102 D X |
| 3,719,769 | 3/1973 | Miyauchi et al. ............ 174/120 SC |
| 3,876,462 | 4/1975 | Carini et al. ............... 174/120 SC X |

FOREIGN PATENT DOCUMENTS

| | | | |
|---|---|---|---|
| 1292078 | 3/1962 | France .................. | 174/68 C |
| 52-56382 | 5/1977 | Japan ................... | 174/68 C |

Primary Examiner—Laramie E. Askin
Attorney, Agent, or Firm—Alan C. Cohen

[57] ABSTRACT

The present invention is a moisture impervious electrical power cable and conduit system. The conduit comprises a moisture impervious, electrically conducting inner layer, which acts as a concentric neutral for the cable, and an outer layer of an electrically insulating or semiconductive polymeric material. The cable, which comprises an insulated central core of electrically conductive material surrounded with a semiconductive polymeric material, is placed longitudinally inside the conduit and is in sufficient electrical contact with the inner layer to allow it to act as a concentric neutral. The cable in conduit article of this invention may then be placed in the ground and should the cable fail, said cable may be withdrawn from the conduit and a new cable drawn through the moisture impervious conduit, thereby eliminating the necessity of disinterring or replacing the entire electrical power line system.

5 Claims, 2 Drawing Figures

MOISTURE IMPERVIOUS POWER CABLE AND CONDUIT SYSTEM

DESCRIPTION

TECHNICAL FIELD

The technical field to which this invention pertains is insulated electrical cables and conduits and in particular moisture impervious electrical cable and conduit systems.

BACKGROUND ART

The same requirements exist for the insulation of underground electrical power distribution and transmission cables as for overhead power transmitting or distribution systems. However, certain additional factors must be taken into consideration when an underground system is considered in lieu of an overhead layout. Two of the principal considerations are the increased hostility of the environment and the relative inaccessibility of the cable once it is placed in the ground.

Underground cables are constantly exposed to moisture which is in the ground, which when coupled with the voltage stress generated by the electrical field, can cause electrochemical treeing (water trees) in the cable insulation. This treeing effect will eventually destroy the insulation to the point where it is ineffectual and the cable is no longer fit for use. In an attempt to combat the corona effect on the insulation, the cable industry has resorted to the addition of a highly conductive layer which acts as a ground electrostatic shield and will drain the extraneous electrical field away from the cable. Additionally, a number of sheathings have been designed to be moisture barriers and used in wraps around the cable, U.S. Pat. Nos. 4,256,921 and 4,145,567. These sheaths, because they are an integral component of the cable, are subject to thermal expansion when the cable is in use. This expansion can cause fatigue failures in the sheath reducing its effectiveness. FIG. 1 is a typical approach which the cable industry has taken to solve the problem. Such cables 1 comprise an electrically conductive core 2 surrounded by a layer of semiconductive polymeric material 3, an electrically insulating layer 4, an outer semiconductive layer 4a, and a moisture resistant and abrasion resistant layer 5 having spirally embedded within it, rods 6 of conductive material which act as a concentric neutral or return conductor for single phase application. Typically copper is used to form the concentric neutral due to its resistance to corrosion. However, copper is relatively expensive and since the concentric neutral constitutes a major cost of the cable itself, adds greatly to the cost of the cable.

In addition to the moisture problem, underground cables are exposed to rough and jagged rocks which can abrade or damage the cable insulation, again making them unfit for service. Due to these and other problems, present in-ground electrical cables do not last forever; in general, their useful life is only about ten to fifteen years.

These electrical power cables, whether used aboveground or underground, are very expensive. Therefore, when a portion of a cable network fails, it would be desirable to be able to locate that portion and repair it by splicing or another technique. This is easily accomplished when the cable network is an overhead system, but not so easy when the cable is buried underground.

When the cable is buried underground, and it fails, it may be possible to locate that portion which is faulty, but repairing it may be much more difficult. In many instances, it may be virtually impossible to unearth the faulty cable due to construction activities which have taken place above the cable subsequent to the cable being interred. For example, buildings, landscaping, roads or airport runways may have been built in the interim, making the cost of replacement economically prohibitive as well as physically difficult. The alternative, then, is to lay down an entirely new cable.

Therefore, what is needed in this art is an improved underground cable and conduit system capable of protecting the underground cable from moisture and abrasion, while allowing the cable to be relatively easily replaced.

BRIEF DESCRIPTION OF THE INVENTION

The present invention is directed toward a moisture impervious electrical power cable conduit through which an electrical power cable is inserted, said conduit comprising a flexible, electrically conductive, moisture impervious inner layer, having an outer layer of an abrasion and moisture resistant polymeric material wherein the inner layer may act as a concentric neutral to the cable. The conduit is designed so that the electrical cable introduced therein will occupy from about 40% to about 80% of its volume.

Another feature of the present invention is a moisture impervious electrical power cable system. This system comprises the above described conduit having an electrical power cable passing longitudinally through it, wherein the electrical cable comprises an electrically insulated core, coated with an outer semiconductive polymeric material. The electrical cable is designed to occupy from about 40% to about 80% of the conduit volume. The system may be formed by introducing the cable into the electrically conductive liner at the time of forming, prior to the liner passing through the extruder for application of the outer polymeric layer. The insulated cable core is jacketed with a semiconductive material which is sufficiently conductive to allow the inner layer of the conduit to act as a concentric neutral. An optional spirally wrapped single drain wire may be placed around the cable semiconductor jacket to create a more positive assurance that there will be sufficient contact between the cable and the inner liner of the conduit to allow it to carry the surface voltage away from the cable and also act to supplement the inner liner cross-sectional volume resistivity as well as simplify the terminal connection.

Other features and advantages will be apparent from the specification and claims and from the accompanying drawings which illustrate an embodiment of the invention.

BEST MODE FOR CARRYING OUT THE INVENTION

Figure 1:
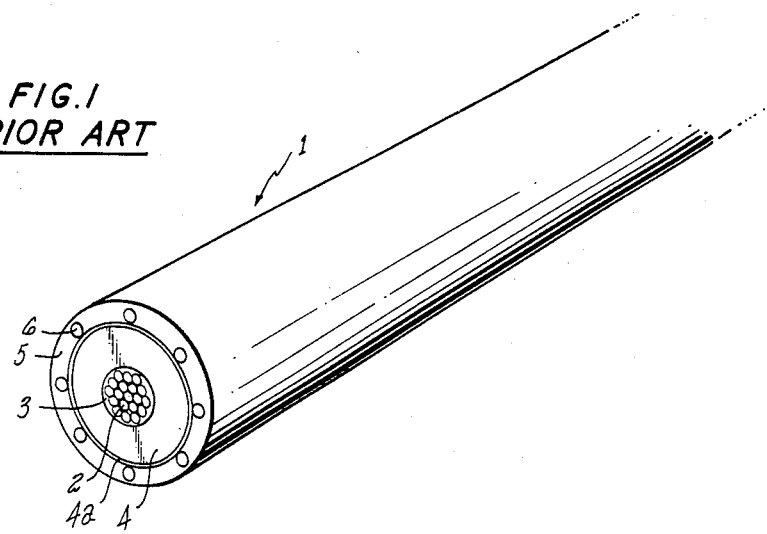
FIG. 1 is a perspective view of one end of a typical prior art design of a moisture resistant cable.
Figure 2:
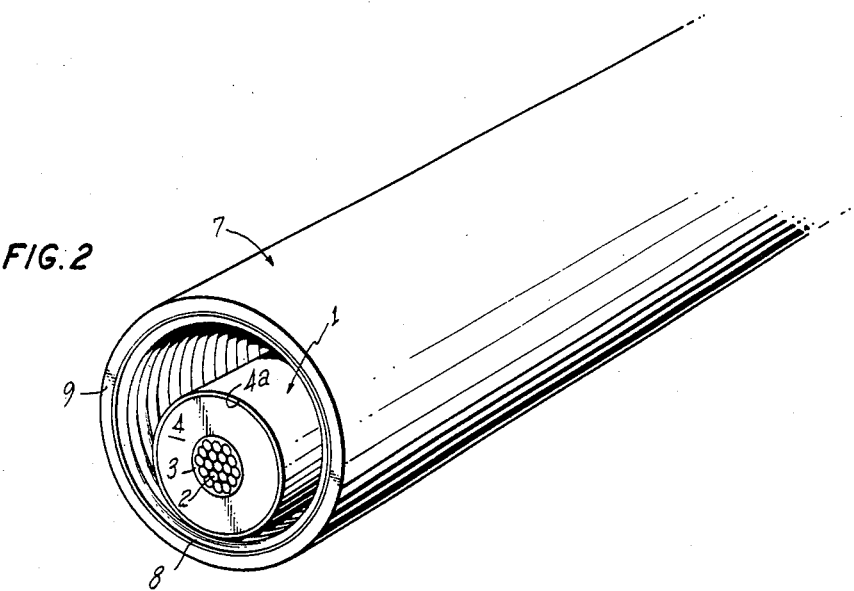
FIG. 2 is a perspective view of one end of a typical cable and conduit assembly according to the present invention.

Referring now to FIG. 2, the electrical cable 1 comprises a central core 2 of electrically conducting material, surrounded by an optional layer 3 of semiconductive polymeric material, an inner layer 4 of electrically insulating polymeric material and an outer layer 4a of semiconducting polymeric material. The polymeric materials utilized in these cables are typically, but need not be limited to, polyethylenes. Cables of this construction are well known, as are the materials used to construct them, and do not constitute part of this invention. The cable is located inside a moisture impervious, abrasion resistant conduit 7 comprising a flexible, electrically conductive, moisture impervious inner layer 8 surrounded by an outer layer 9 of electrically insulating or electrically semiconductive and abrasion resistant polymeric material. The cable is substantially in electrical contact with the inner layer such that the inner layer acts as a concentric neutral. Typically, the conduit is structured such that the cable to be used in it will occupy about 40% to about 80% of the conduit volume.

The electrically conductive inner layer may be formed of any electrically conductive material, copper being preferred. This inner layer is formed into a tube which is made impervious to moisture by sealing the longitudinal edges by any conventional means, i.e. welding, soldering, bonding, etc. Typically, the inner layer is manufactured by passing a thin sheet, about 6 mils to about 12 mils in thickness, of the conductive material through a stamping machine or conventional corrugating apparatus, forming a long sheet of corrugated material. The corrugations are radially oriented. This sheet is subsequently formed into a tubular shape wherein the edges are sealed watertight by welding. The thickness of the tube may vary, however, its volume resistivity should be equal to that of the core 1 thereby constituting a 100% concentric neutral.

A protective insulating or semiconducting polymeric material is then placed around the inner layer to a thickness of about 100 mils to about 200 mils. The use of a semiconductive layer would be useful as a grounded shielding protecting the cable from lightning surges. The material should have good abrasion and moisture resistance. Typically, this material is polyethylene, with the preferred material being medium density or high density polyethylene; however other materials which may be used are polyvinylchloride or chlorinated polyethylene. The polymeric jacket may be applied using any conventional technique, the preferred being extrusion.

The electrical cable may then be inserted into the conduit prior to being laid in the ground, constituting a moisture protected electrical cable and conduit system. This may be accomplished by preinstallation of the cable into the conduit at the factory by simultaneously feeding the cable into the conduit during the forming and jacketing of the conduit.

EXAMPLE

A two-inch diameter conduit, and a 25 Kv cable of the present invention were made as follows:

An 8 mil sheet of copper approximately six inches in width was corrugated with radial corrugations, and corrugations being about one-eighth inch apart, by passing it through a conventional corrugating machine. The corrugated sheet was then formed into a tube by bending the sheet around materials and welding the edges of the sheet together. Thermoplastic, medium density polyethylene 880 compound from Dow Chemical Corporation was then extruded, using a cross-head type die at an extrusion temperature of 400° F. (204° C.), about the outside of the tube to a thickness of 150 mils. It was then cooled to ambient temperature about 65° F. (18° C.) to about 75° F. (24° C.) in a water bath.

A 25 Kv electrical cable which was placed inside the conduit to form the underground cable and conduit system was made of stranded 1/0 (105.6 Kcil) aluminum cable (19 strands) which was coated by extrusion in a conventional manner incorporating a layer of semiconductive polyethylene over which was extruded a layer of cross-linked polyethylene insulation with an outer semiconducting shielding layer. The layers were respectively about 25 mils, 270 mils and 30 mils in thickness. The cable was then placed inside the conduit and in substantial electrical contact with the copper tube such that the inner liner was able to act as a concentric neutral directing the surface voltage away from the cable, forming the electrical cable and conduit system. Additionally, since the moisture impervious inner liner of the conduit is not an integral part of the cable, it does not suffer from the problems associated with the prior art protective sheathings, i.e. thermal expansion.

Electrical cable conduits of this type may be constructed to house cables ranging from 5000 volts to 35,000 volts and higher. The principal consideration in selecting the conduit is that the cable should occupy about 40% to about 80% of the conduit volume to allow for ease of replacement, and also the conduit should have an ample amount of electrically conductive lining to act as the concentric neutral for the cable.

There are at least four principal advantages to conduits of the present invention. The first is that the flexible moisture impervious conduit will eliminate the phenomenon of electrical treeing which is so destructive to prior art cable insulation. The second is that underground cable laid using this conduit will allow for the easy replacement of old or malfunctioning electrical cable. This may be accomplished by drawing out the old cable and replacing it by simply passing the new cable through the conduit. This process would eliminate the extensive digging required by the present cables.

Thirdly, the original cable as well as the replacement cable will be much lower cost. The reduced cost will stem from the fact that presently the concentric neutral is an integral part of the cable, and contributes substantially to the cost of producing the cable. However, since the neutral is incorporated into the conduit itself, the need for it on the cable is no longer required, therefore reducing the cost of the original cable as well as the replacement.

Fourth, the presently used concentric neutral wires offer no moisture protection to the cable whereas in the present invention their metal content is now incorporated and transformed into the conduit neutral which is moisture impervious.

A further reduction in the cost of the electrical cable will be derived from moisture resistant protection of the conduit. Presently, the electrical cable is jacketed with a relatively expensive, insulating material. With the cable now being protected from moisture by the conduit, the cable would only need to have a semiconducting screen, which does not have to be moisture impervious or abrasion resistant, and is considerably less expensive, thereby leading to additional lower cable cost.

It should be understood that the invention is not limited to the particular embodiments shown and described herein, but that various changes and modifications may be made without departing from the spirit and scope of this novel concept as defined by the following claims.

I claim:

1. An underground moisture impervious, electrical power cable and conduit system comprising:

a moisture impervious, flexible conduit having an inner layer of a flexible, moisture impervious, electrically conductive material, and an outer layer of a polymeric, electrically insulating material, said conduit having a high voltage electrical cable loosely disposed inside, said cable comprising a core of electrically conductive material coated with an electrically insulating polymeric material about which is a layer of semiconductive polymeric material, wherein said cable is in sufficient electrical contact with the inner layer of the conduit which acts as a concentric neutral.

2. An underground moisture impervious, electrical power cable and conduit system comprising:

a moisture impervious, flexible conduit having an inner layer of a flexible, moisture impervious, electrically conductive material, and an outer layer of a polymeric, semiconductive material, said conduit having a high voltage electrical cable loosely disposed inside, said cable comprising a core of electrically conductive material coated with an electrically insulating polymeric material about which is a layer of semiconductive polymeric material, wherein said cable is in sufficient electrical contact with the inner layer of the conduit which acts as a concentric neutral.

3. The system of claim 1 or 2 wherein the inner layer is a copper tube.

4. The system of claim 3 wherein the copper tube is corrugated.

5. The system of claim 4 wherein the outer layer comprises a medium density polyethylene.

* * * * *